(12) United States Patent
Fernandez et al.

(10) Patent No.: US 10,373,469 B2
(45) Date of Patent: Aug. 6, 2019

(54) AUTONOMOUS PEOPLE RESCUE SYSTEM FOR VESSELS AND SHIPWRECKS

(71) Applicants: Maite Alejandra Fernandez, Santiago (CL); Rosa Virginia Rugiero, Buenos Aires (AR); Horacio Alberto Morilla, Buenos Aires (AR)

(72) Inventors: Maite Alejandra Fernandez, Santiago (CL); Rosa Virginia Rugiero, Buenos Aires (AR); Horacio Alberto Morilla, Buenos Aires (AR)

(73) Assignees: Rosa Virginia Rugiero, Buenos Aires (AR); Horacio Alberto Morilla, Villa Adelina (AR)

( * ) Notice: Subject to any disclaimer, the term of this patent is extended or adjusted under 35 U.S.C. 154(b) by 2 days.

(21) Appl. No.: 15/559,593

(22) PCT Filed: Mar. 19, 2015

(86) PCT No.: PCT/CL2015/050008
§ 371 (c)(1),
(2) Date: Jan. 22, 2018

(87) PCT Pub. No.: WO2016/145543
PCT Pub. Date: Sep. 22, 2016

(65) Prior Publication Data
US 2018/0174422 A1    Jun. 21, 2018

(51) Int. Cl.
*B63C 9/00*     (2006.01)
*B63C 9/02*     (2006.01)
(Continued)

(52) U.S. Cl.
CPC .......... *G08B 21/088* (2013.01); *A44C 5/0007* (2013.01); *B63B 23/70* (2013.01); *B63C 9/0005* (2013.01); *B63C 9/02* (2013.01); *B63C 9/22* (2013.01); *B63C 9/26* (2013.01); *G01S 5/02* (2013.01); *G01S 19/00* (2013.01); *G01S 19/17* (2013.01); *B63B 2035/005* (2013.01); *B63B 2035/007* (2013.01); *B63C 2009/0017* (2013.01)

(58) Field of Classification Search
CPC .................................................... G08B 21/088
USPC ........................................................... 340/8.1
See application file for complete search history.

(56) References Cited

U.S. PATENT DOCUMENTS 5,192,238 A   3/1993 Brown
5,463,598 A   10/1995 Holland et al.
(Continued)

FOREIGN PATENT DOCUMENTS

CA    2354816    2/2002

*Primary Examiner* — Santiago Garcia
(74) *Attorney, Agent, or Firm* — Defillo & Associates; Evelyn A. Defillo

(57) ABSTRACT

This invention refers to an innovative, original and convenient Autonomous System for Rescue operations, which works on the vessel, program controlled by a software and hardware platform rescuing people overboard in an autonomous manner. The System starts operating from the moment the person falls off the deck into the water. From the moment the wrist band on the passenger makes contact with the water, it sends out a radio frequency signal with two orders: to activate an alarm and to notify a robot to start rescue operation, and it brings it to the vessel with no intervention from people, i.e., in an intelligent and autonomous manner.

7 Claims, 5 Drawing Sheets

(51) Int. Cl.
  *B63B 23/70* (2006.01)
  *G01S 19/00* (2010.01)
  *G01S 19/17* (2010.01)
  *A44C 5/00* (2006.01)
  *B63C 9/22* (2006.01)
  *B63C 9/26* (2006.01)
  *G01S 5/02* (2010.01)
  *G08B 21/08* (2006.01)
  *B63B 35/00* (2006.01)

(56) References Cited

U.S. PATENT DOCUMENTS

| | | | |
|---|---|---|---|
| 5,597,335 A | 1/1997 | Woodland | |
| 5,886,635 A | 3/1999 | Briartek | |
| 6,222,484 B1 | 4/2001 | Seiple | |
| 6,558,218 B1 | 5/2003 | Hansen | |
| 8,998,666 B1* | 4/2015 | Albright | B63C 9/00 340/539.13 |
| 2002/0119715 A1 | 8/2002 | Pons | |
| 2008/0062816 A1 | 3/2008 | Leal | |
| 2009/0156139 A1* | 6/2009 | Lee | G01S 5/0027 455/90.1 |
| 2010/0210157 A1* | 8/2010 | Koulouris | B63C 9/04 441/80 |
| 2012/0006277 A1* | 1/2012 | Troy | A01K 61/65 119/223 |
| 2012/0224063 A1* | 9/2012 | Terre | G08B 13/1963 348/148 |
| 2013/0214942 A1* | 8/2013 | Joss | G08B 21/088 340/984 |
| 2014/0323079 A1* | 10/2014 | Paolini | G08B 25/016 455/404.2 |
| 2015/0059636 A1* | 3/2015 | Chezhian | B63B 39/06 114/349 |
| 2016/0214692 A1* | 7/2016 | Noras | B63B 35/7943 |
| 2016/0253906 A1* | 9/2016 | Celikkol | G01S 3/784 701/21 |
| 2016/0340006 A1* | 11/2016 | Tang | B63C 9/01 |
| 2018/0285710 A1* | 10/2018 | Teetzel | G01S 17/00 |
| 2018/0319495 A1* | 11/2018 | Tu | B64C 39/024 |

* cited by examiner

AUTONOMOUS PEOPLE RESCUE SYSTEM FOR VESSELS AND SHIPWRECKS

CROSS REFERENCE TO RELATED APPLICATION

This application is a national stage entry of PCT/CL2015/050008 filed Mar. 19, 2015, under the International Convention.

TECHNICAL FIELD

This invention refers to an innovative, original and convenient Autonomous System for Rescue operations, which works on the vessel, program controlled by a software and hardware platform rescuing people overboard in an autonomous manner. The System starts operating from the moment the person falls off the deck into the water. From the moment the wrist band on the passenger makes contact with the water, it sends out a radio frequency signal with two orders: to activate an alarm and to notify a robot to start rescue operation, and it brings it to the vessel with no intervention from people, i.e., in an intelligent and autonomous manner.

SUMMARY OF THE INVENTION

The Rescue System includes two robots installed in the docks at flotation level, which are placed at the rear sides of the vessel and, from there, the robots will be activated in an autonomous manner.

The number of robots is determined by the number of passengers of each vessel.

The system works as follows: Each passenger, without exception, will wear a wrist band with magnetic safety closure in the arm, at the wrist area, upon boarding.

When the wrist band is outside the deck radius and makes contact with water, such wrist band sends out two signals: one radio signal that is triangulated by three receivers and provides the robot with an accurate position, and the other signal that carries the GPS coordinates. With those two signals and the information received, the system sends the robot to the water to find the passenger through the signals coming from the wrist band. When the robot finds the passenger, the system sends out two radio orders to the robot: to adhere to the wristband and to inflate a lifeline, similar to an airbag, which is included within the robot. The passenger can hold on to the lifeline. The System programs that, after five seconds the passenger is found by the robot and is already rescued, the rescue winch is to be activated.

In case the vessel sinks or wrecks, the System features horizontal and vertical orientation sensors registering the variations of the vessel and, upon detection of sinking, the System switches to the emergency system moving to the rescue rafts. The System then operates at the rafts in the same way as in the vessel, triangulating the position of the wristband as it did in the vessel. The rafts provide the coordinates, and the robots within the rafts start rescue operations following the same protocol and rescue method as in the main vessel.

The object of this invention is to save the lives of passengers falling into the water, and to act in the same way in case of wreck. The System rescues all the crew in the water.

In general, as it is well known, all the vessels include rescue equipment according to standards, and they are useful for passengers who cannot swim. With this equipment, intervention of a person is inevitable, and there must be people watching that nobody falls overboard. As the experience suggests, current resources are not enough to save lives, either due to people not being able to swim or because they may fall into the water in an unconscious state. If the passengers are able to swim, they are provided with a lifeline. If somebody sees them falling, rescue will take quite a long time.

Another characteristic to be consider, even in medium vessels for offshore fishing at polar seas, is that if the passenger is able to swim, rescue reverse is very slow and the passenger will die from hypothermia.

For cruise ships featuring rescue hatchs with jet skies, the cruise ship must be at the open sea to make a turn, since it is known speed should be gradually reduced in water, and this makes the vessel turn. If we consider an average speed of 25 to 30 knots, a person who falls off at such speed, the relatively long time needed for the vessel to rescue him/her, and the fact that the person is not able to swim, it would be fatal.

DETAILED DESCRIPTION OF THE INVENTION

This invention refers to an innovative, original and convenient Autonomous System for Rescue operations, which works on the vessel, controlled in an autonomous manner by a smart Rescue System through a software executing several interfaces. For that reason, it is not possible to refer to only one figure, since they all interact with each other.

Figure 1:
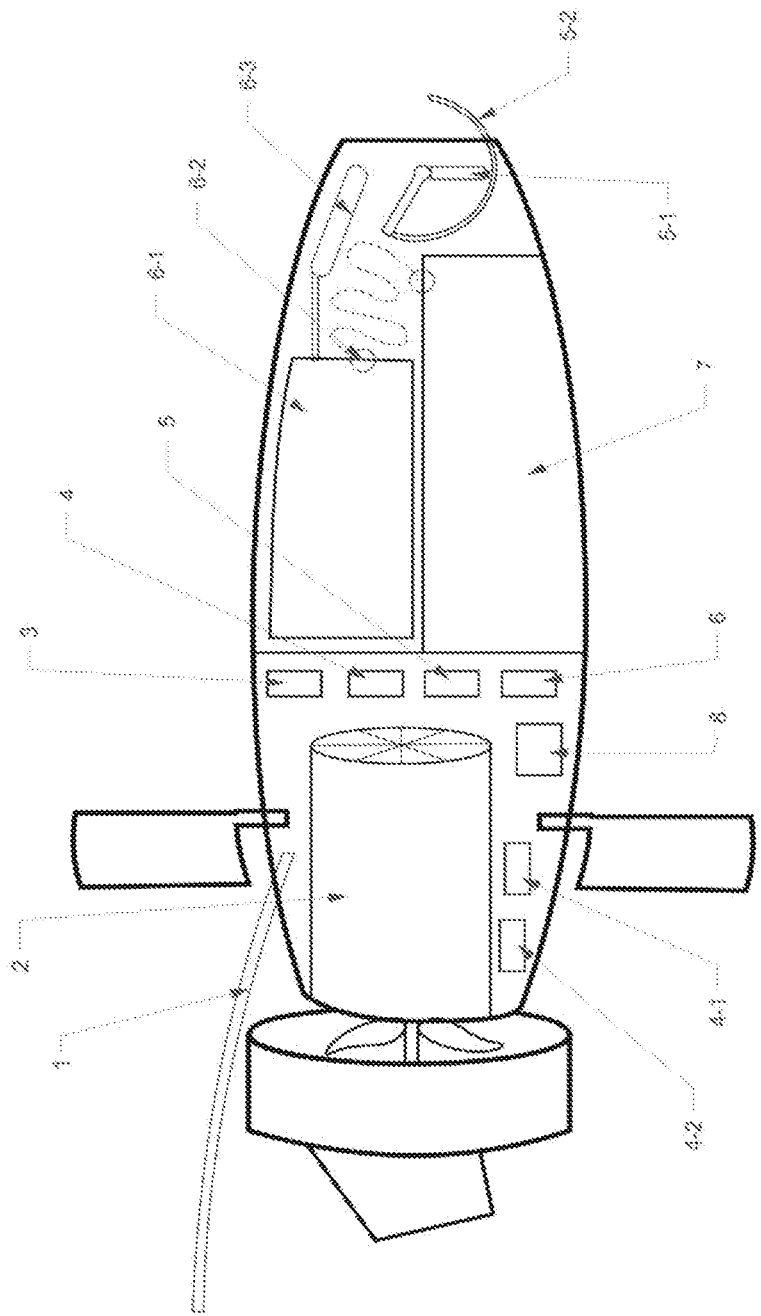
FIG. 1 shows a perspective front view of the smart rescue system robot according to the present invention.
Figure 2:
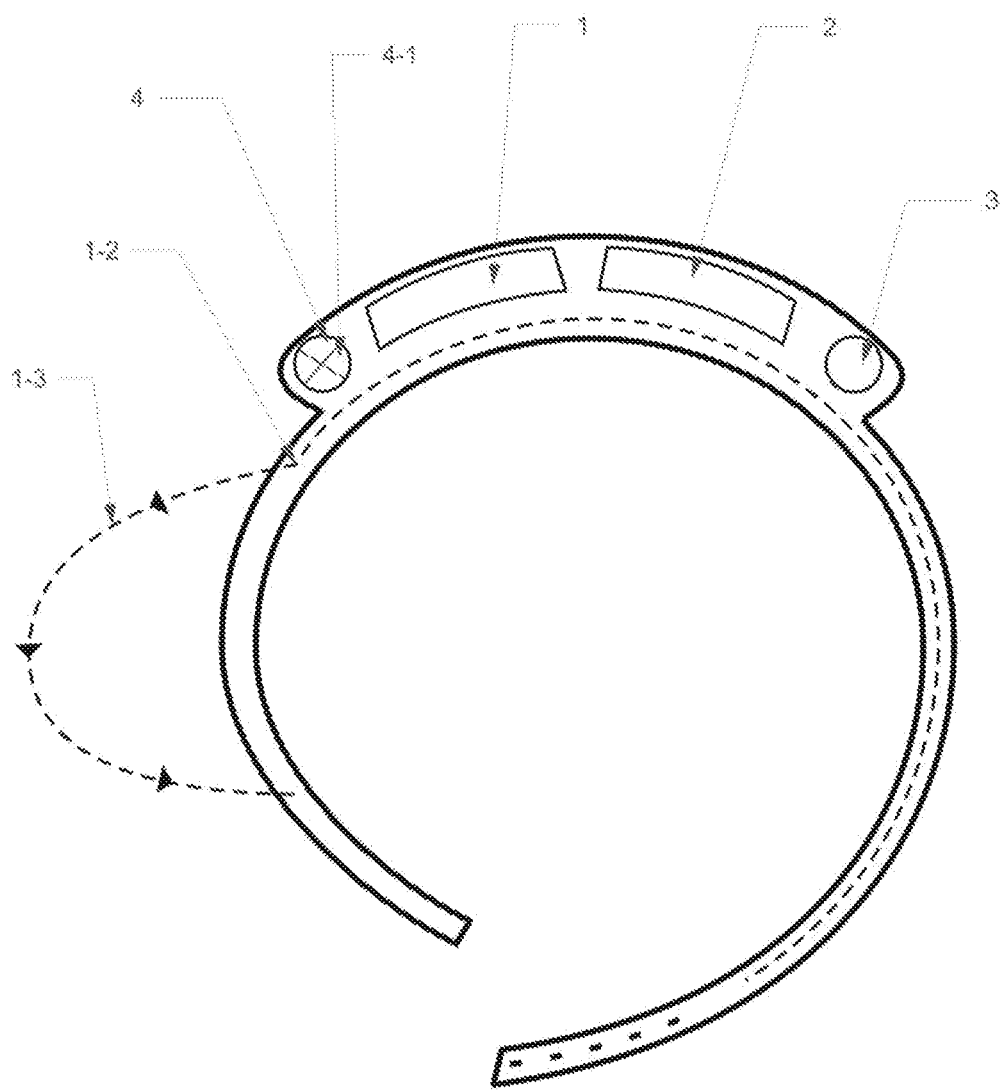
FIG. 2 shows a front view of the wristband according to the present invention.
Figure 3:
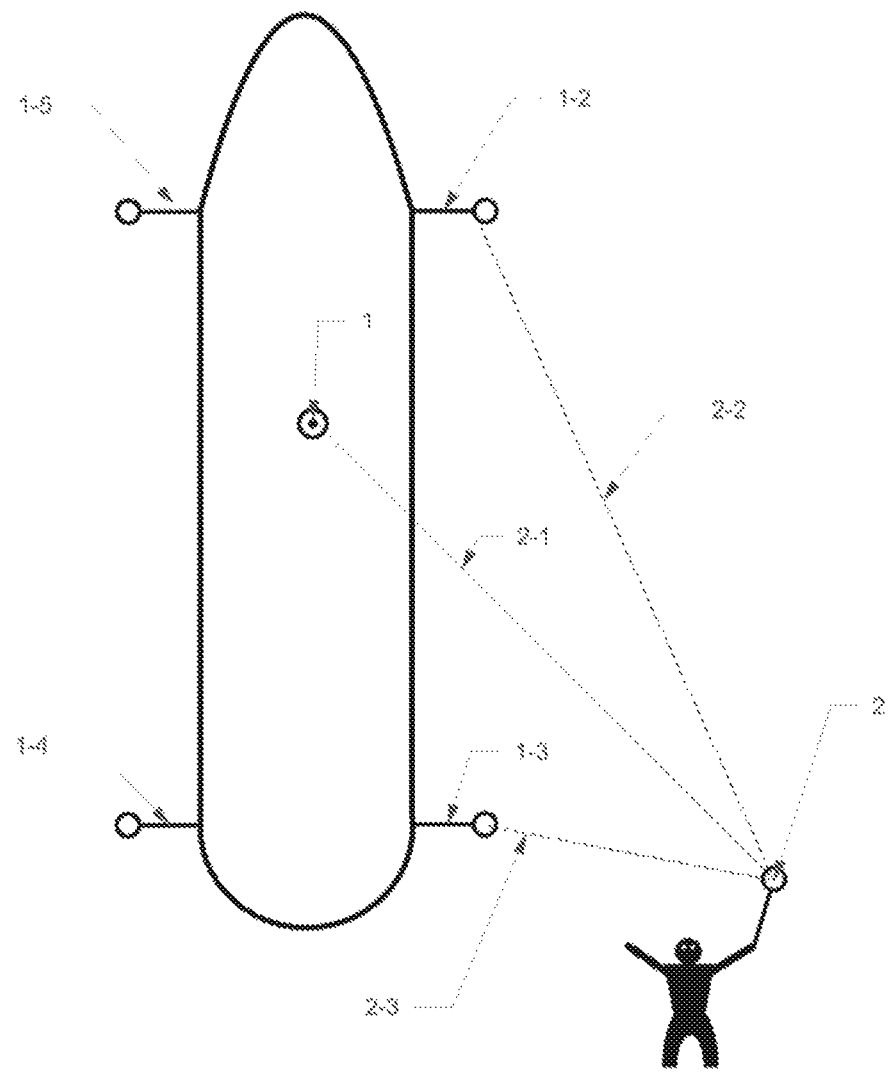
FIG. 3 shows a scheme of the radio triangulations according to the present invention.
Figure 4:
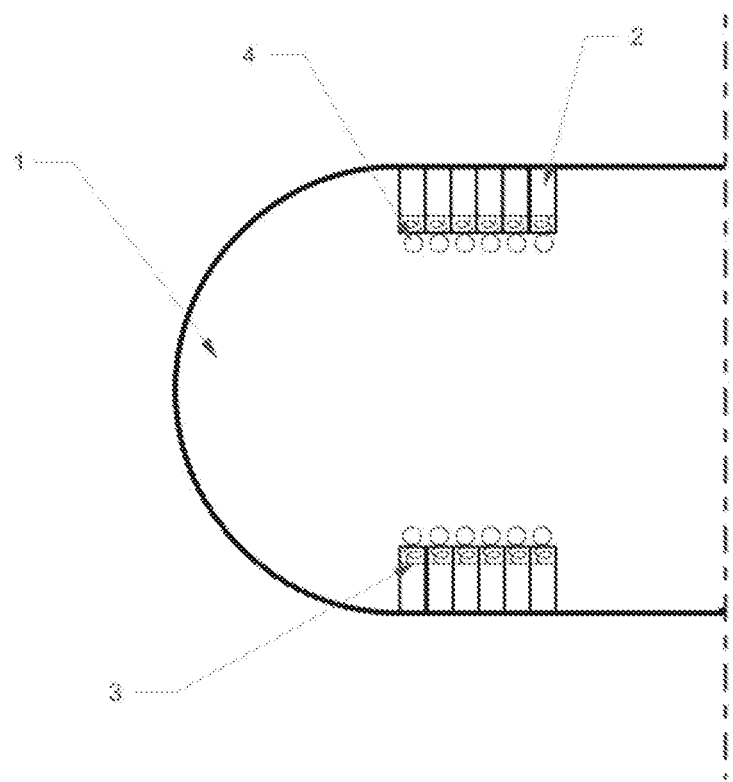
FIG. 4 shows a scheme of the robot dock according to the present invention.
Figure 5:
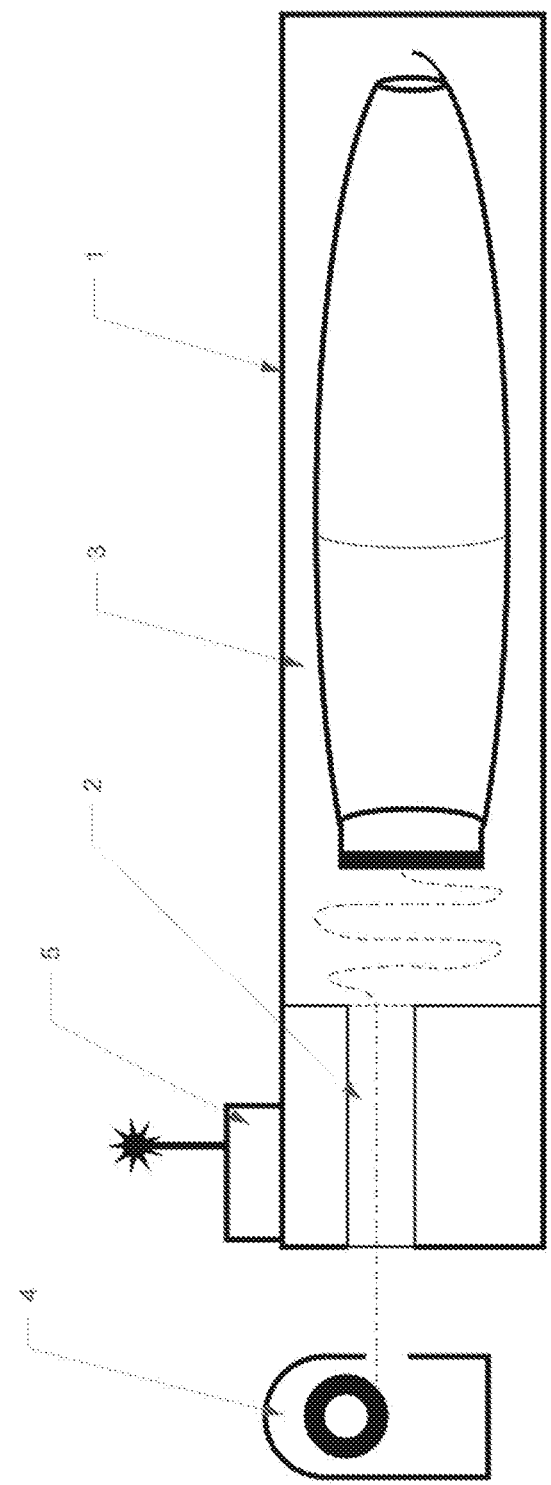
FIG. 5 shows a scheme of a housing system at docks according to the present invention.

The system works with the crew from the vessel who shall wear a wristband with magnetic safety closure on their arms at the wrist area FIG. 2 when the wristband is outside the deck radius FIG. 3 and when the wristband touches the water FIG. 2-4 it sends out a signal to the radio FIG. 2-1 and the GPS FIG. 2-4 connects to the radio FIG. 2-1, sends out a signal with the coordinates from the antenna FIG. 2-1.2, 2-1.3, which is received by the three receivers FIG. 3-1, 3-1.2, 3-1-3 and FIG. 3, radio triangulation 3-2-1, 3-2.2 and 3-2.3, and the microprocessor receives both orders providing the exact position from the GPS, and through radio triangulation to the robot FIG. 1-8, with those coordinates, the System sends the robot to the water FIG. 5-2; with this information, the helm FIG. 1-4.2 starts searching; once the person is detected, it adheres to the magnetic wristband FIG. 2-1.3 and FIG. 1-5-1, which is the engine moving the magnetic hook, FIG. 1-5.2 magnetic hook that adheres to the wristband, FIG. 1-6.3 compressed air cylinder, FIG. 1-6.2 restraining cord from the lifeline to the robot, FIG. 1-6.1 lifeline and, in that moment, a lifeline similar to an airbag inflates, which is within the robot and can hold the person; and, at the same time, FIG. 1-6.3 a buoy inflates, which keeps the robot floating FIG. 1-7; after 5 seconds from the moment the System registered FIG. 1-8 that the person was found and the robot holds him/her by the wristband, the rescue winch FIG. 5-4 is automatically activated, without any intervention from a person; the autonomous rescue system takes the person by the wristband and brings him/her to the vessel with the robot.

In case the vessel sinks or wrecks, the System features horizontal and vertical orientation sensors at list level FIG. 5-5 registering the variations of the vessel and, upon detection of sinking, the System switches to the emergency system moving to the rescue rafts. The System then operates at the rafts in the same way and following the same protocol as in the vessel, triangulating the position of the wristband as it did in the vessel. The rafts provide the coordinates, and the robots within the rafts start rescue operations following the same protocol and rescue method as in the main vessel.

FIG. 1—Robot
1—Power cable of robot driving engine, energy 24 volts
2—Driving engine, 24 volts, variable weight
3—Engine controllers
4—Helm engine controllers and flotation levelers
4-1 Flotation level engines
4-2 Helm engine
5—Controller of wristband attachment hook
5-1 Driving engine of wristband attachment hook
5-2—Magnetic hook of wristband attachment Lifeline controller
6-1 Lifeline
6-2 Lifeline attachment cord
6-3 Air compressed tube for inflating lifelines
7—Flotation balancing air chamber and buoy holder to be inflated to carry the weight of the robot
8—Programmable microprocessor, algorithm including 3000 numbers of wristband and detecting the ones containing the system FIG. 2 Wristbands
1—Microprocessor transmitting radio UHF-BHF and FR marine of cultivated depth
1-2 Transmitting radio antenna
1-3 Rope magnetic buttonhole latex cover robot fastener
2—GPS
3—Power batteries
4—Water sensor
4-1 Water sensor sending out radio signals to active the alarms FIG. 3 Radio Triangulations
1-1.2, 1.3, 1.4, and 1.5 receiving nodes for triangulation
2—Transmitting wristband sends out the signal 2.1, 2.2, 2.3

FIG. 4 Robot Docks
   1—Stern or back of the vessel
   2—Robot housing
   3—Robot spring catapult
   4—Winch for rescuing the person with the robot and the lifeline FIG. 5 Housing System at Docks
1—Robot holder compartment
2—Robot ejector piston
3—Power cable and rescuing cable
4—Rescue winch Having described and determined the nature and scope of this invention and the manner it should be implemented, claim is hereby made as exclusive property invention:

1. An autonomous rescue system for passengers of vessels comprising:
   a signal transmitter wristband with water sensor;
   a multi-band radio transmitter with antenna and batteries;
   a GPS device providing geostationary position to the radio, and coordinates that is transmitted through the radio to a system processing the information from the triangulation with a first way and a second way to find a person wearing the transmitter wristband;
   wherein the first way is by triangulation and the second way is geostationary position with GPS
   wherein a robot is propelled into the water from a dock searching for the geostationary position and the triangulation of the transmitting radio, wherein once the person wearing the wristband is found, the robot magnetically adheres to such wristband, wherein at that point, a lifeline is activated and a buoy, which keep the robot floating and the robot sends a radio signal to the dock, which contains a winch and starts pulling the power cable from the robot, bringing back the person to the vessel.

2. The system according to claim 1, wherein the triangulation is performed by three receivers located one at a center of the vessel, at a front end of the vessel, and at the back end of the vessel.

3. The system according to claim 1, wherein the wristband sends out a signal with coordinates and the system receives one of the signals with geostationary positioning and with the other signal triangulates the position of the vessel concerning the wristband on the person.

4. The system according to claim 1, wherein there are docks containing robots from the system.

5. The system according to claim 1, wherein the vessel includes docks at a back end and the sides ends, each dock includes a robot operated by a wireless radio system receiving the orders from the triangulation and the geostationary position of the wristband on the person.

6. The system according to claim 1, wherein in case of sinking or wreck, the system features sensors at the list level with horizontal and vertical orientation, which register the variations detecting the vessel is sinking.

7. The system according to claim 1, wherein the system switches to the emergency system moving to the rescue rafts, wherein the system then operates at the rafts in the same way and following the same protocol as in the vessel, triangulating the position of the wristband as in the vessel, the rafts provide the coordinates, and robots within the rafts start rescue operations following the same protocol and rescue method as in the main vessel.

\* \* \* \* \*